United States Patent [19]

Anderson

[11] 3,715,892
[45] Feb. 13, 1973

[54] PURIFICATION OF CRYSTALLIZABLE MATERIAL BY DIRECTIONAL FREEZING

[75] Inventor: Ernest Leslie Anderson, Johannesburg, Republic of South Africa

[73] Assignee: South African Inventions Development Corporation, Pretoria, Republic of South Africa

[22] Filed: Feb. 22, 1971

[21] Appl. No.: 117,622

[30] Foreign Application Priority Data

March 5, 1970 South Africa..................70/1496

[52] U.S. Cl. ..........................62/58, 23/273, 62/123
[51] Int. Cl. ..............................................B01d 9/04
[58] Field of Search............23/301 SP; 62/58; 23/273

[56] References Cited

UNITED STATES PATENTS 3,428,437  2/1969  Anderson.........................23/301 SP Primary Examiner—Norman Yudkoff
Assistant Examiner—S. Silverberg
Attorney—Young & Thompson

[57] ABSTRACT

Purification of crystallizable material by directional freezing wherein a molten mass of the material is progressively solidified from a first region in the mass to a second region in the mass; the material is rotated during solidification to subject the material to centrifugal force which is at least equal to the force of gravity, preferably at least ten times the force of gravity, and which acts in a direction transversely to the direction of solidification; and heat is introduced into the molten material to induce convective flow of molten material past the advancing solid-liquid interface in a direction transversely to the direction of solidification, preferably in the same direction as that in which the centrifugal force acts.

9 Claims, 4 Drawing Figures

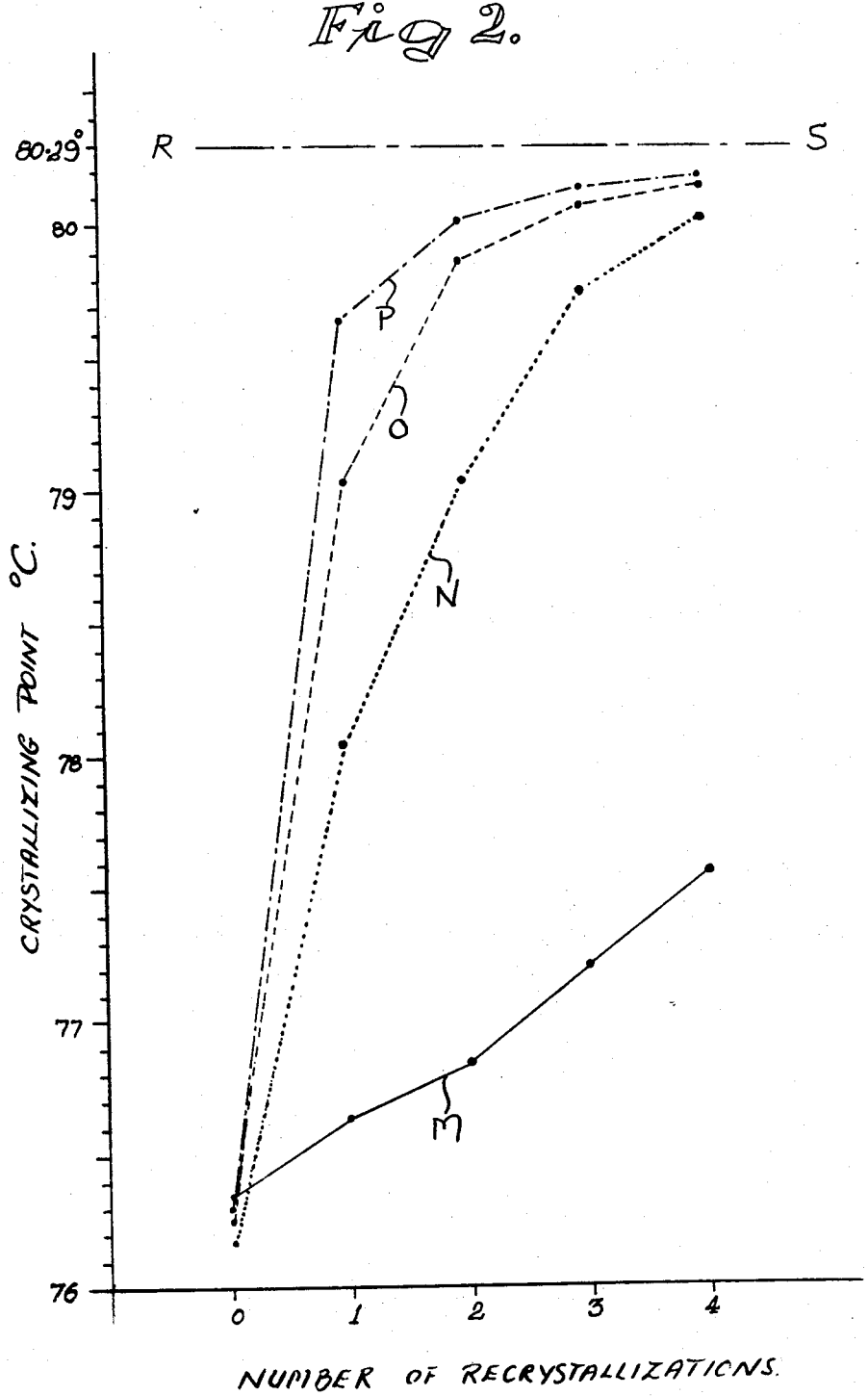

PURIFICATION OF CRYSTALLIZABLE MATERIAL BY DIRECTIONAL FREEZING

This invention relates to the purification of crystallizable materials by directional freezing.

Directional freezing is a known technique for the purification of crystallizable materials. In this method a molten mass of the material to be purified is caused or allowed to solidify progressively from a first region in the mass towards a second region in the mass spaced from the first.

Segregation of the impurities contaminating the material to be purified generally occurs at the solid-liquid interface, also called the freezing interface, due to a difference in solubility of the impurities in the solid and liquid states of the material i.e., the solid material freezing out has a different composition from the liquid material.

In order to obtain the best results with conventional methods, the rate of progress of the advancing freezing interface must be sufficiently slow to allow the solid material crystallizing out to come into equilibrium with the remaining liquid. This necessity is a very serious disadvantage of the technique, as purification is very slow.

It is accordingly an object of the present invention at least to minimize the above disadvantages.

According to the invention a method of purifying crystallizable material comprises the steps of causing or allowing a molten mass of the material to solidify progressively from a first region in the mass to a second region in the mass; rotating the material during solidification to subject the material to centrifugal force which is at least equal to the force of gravity and which acts in a direction transversely to the direction of solidification; and introducing heat into the molten material to induce convective flow of molten material past the advancing solid-liquid interface in a direction transversely to the direction of solidification.

It has been found that with the method according to the invention, solidification of the molten material may be much faster than with conventional methods for a given degree of purification, thus eliminating the need for a very careful control of the rate of solidification in order to obtain reasonably purified material.

The material is preferably rotated about an axis which does not pass through the material to ensure that a sufficiently large centrifugal fore is applied to all the material under treatment.

The centrifugal force preferably has a magnitude at least ten times the force of gravity.

The convective flow of molten material past the advancing solid-liquid interface is preferably in the same direction as that in which the centrifugal force is acting.

Heat may be introduced into the molten material in any suitable manner in order to induce the convective flow of molten material. Preferably, heat is directed into the molten mass in a direction along and in a position ahead of the advancing solid-liquid interface from a heat source which is of localized extent in the direction of advance of the solid-liquid interface.

According to another aspect of the invention directional freezing apparatus comprises a material container rotatable about an axis and having a retaining wall spaced from the axis and rotatable with the container about the axis; drive means operative to rotate the container at a speed producing centrifugal force in excess of the force of gravity to urge material in the container against the retaining wall; at least one freezing surface in the container in the proximity of the retaining wall, the freezing surface being operative to solidify molten material located in the container against the retaining wall and to produce a solid-liquid interface advancing progressively in a direction transversely to that in which the centrifugal force acts; and convective heating means operatively related to the container to direct heat into the container and induce a convective flow of molten material past the advancing solid-liquid interface in a direction transversely to the direction of solidification.

The apparatus may include a pair of spaced apart, opposed freezing surfaces operative to produce a pair of solid-liquid interfaces advancing progressively in opposite directions towards each other.

Means may be provided for cooling each freezing surface.

The convective heating means may comprise a heating element having limited dimensions in an axial direction and located about the rotational axis in close proximity to the retaining wall in a position spaced axially from the or each cooling surface.

Where a pair of spaced, opposed cooling surfaces are provided, the convective heating element may be located intermediate the cooling surfaces.

Additional heating means may be provided for controlling the molten condition of material in the container.

Preferred embodiments of the invention will now be described by way of example with reference to the accompanying drawings in which:

FIGS. 2 and 3 are graphical representations of naphthalene crystallizing points and naphthalene contents which are obtained when crude coke oven naphthalene is treated in accordance with the invention in apparatus similar to that of FIG. 1 at rotational speeds of 500 r.p.m. and 2,000 r.p.m., as compared with directional freezing in stationary systems.

Figure 1:
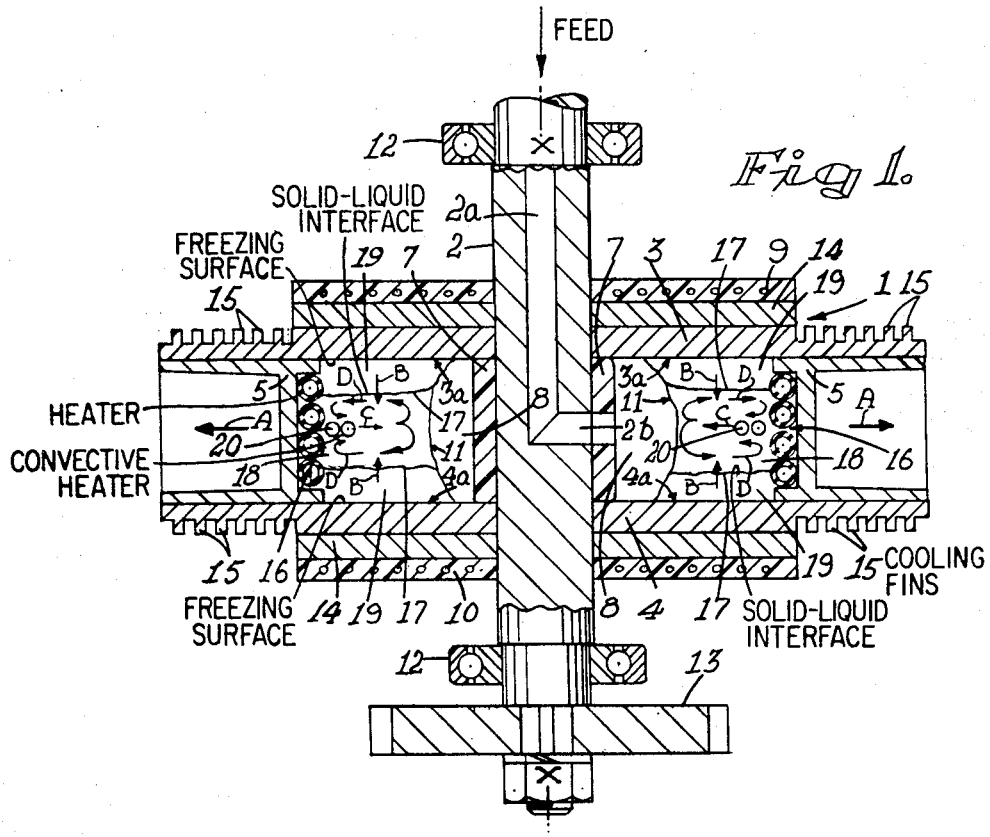
FIG. 1 is a diagrammatic vertical sectional view of one form of rotary directional freezing apparatus suitable for carrying out the invention.

Referring to FIG. 1, the apparatus comprises rotary container 1 presenting an annular freezing chamber which is defined between upper and lower aluminum end plates 3 and 4, inner ring 7 and outer aluminum ring 5. Container 1 is mounted on hollow shaft 2 and is rotatable therewith about axis X—X.

Hollow shaft 2 is rotatably mounted in bearings 12 and is provided with gear 13 which is adapted to be coupled to suitable drive means. Hollow shaft 2 presents axial bore 2a having a radial port 2b communicating with the interior of container 1.

End plates 3 and 4 carry plate type electrical heating elements 9 and 10 respectively, each of the heating elements 9, 10 being in face to face contact with a heater plate 14, which, in turn, is located in face to face contact with its end plate 3 or 4, as the case may be.

End plates 3 and 4 are provided with circumferential cooling fins 15 around the peripheries of their outer surfaces. The inner surfaces 3a, 4a of end plates 3, 4 constitute freezing surfaces as will be described in greater detail below.

Peripheral electric heating means 16 comprising a helically wound insulated conductor, is located around the inner periphery of outer ring 5. In addition, annular electric convective heating element 20 comprising a bare conductor wound in the form of a flat helix, is located around the inner periphery of peripheral heating means 16 in a position intermediate end plates 3 and 4. It will be seen that convective heating element 20 has restricted dimensions axially in the direction of axis X—X and is axially spaced from the two freezing surfaces 3a, 4a.

The whole assembly is adapted to be detachably bolted together so that it can be dismantled easily to permit recovery of recrystallized material in container 1 after directional freezing treatment of material in the container. One or more suitable tap holes (not shown) may be provided in outer ring 5 to permit unfrozen material to be drained off from container 1.

Heating elements 9, 10, 16, and 20 are supplied with electric current through slip-rings (not shown) on shaft 2 as will be clear to a man skilled in the art.

In use, crystallizable material which is to be refined, is introduced into the interior of the container in a molten condition through bore 2a and port 2b in hollow shaft 2, so as to only partially fill the container.

To ensure that all the material in container 1 is completely molten at the commencement of the directional freezing treatment, end plates 3, 4 may be heated by means of heating elements 9, 10. Additional heat may be provided by peripheral heating means 16 and convective heating element 20.

Upon rotation of container 1 about axis X—X, which is spaced from the material in the container, the material is subjected to centrifugal force which acts in the direction of arrows A and urges the material against the outer ring 5 which acts as a retaining wall rotating with container 1. Space 8 is thus left between the inner surface 11 of the annular layer of material and inner ring 7. Container 1 is rotatably driven at a suitable speed to subject the material in the container to centrifugal force having a magnitude at least 10 times the force of gravity at the inner surface 11 of the molten material.

When all the material in the rotating container 1 is in suitable molten form, heating elements 9 and 10 are switched off to permit atmospheric cooling of end plates 3 and 4 with the aid of rotating cooling fins 15. Cooling of end plates 3, 4 causes or allows freezing surfaces 3a, 4a to solidify molten material in contact therewith. Molten material solidifies progressively from freezing surfaces 3a, 4a in opposite directions transversely to the direction of the centrifugal force so that solid-liquid interfaces 17 advance progressively in the direction of arrows B. Layers 19 of solidified material are formed on freezing surfaces 3a, 4a.

Freezing in a radial direction inwardly from outer ring 5 is prevented by suitable application of heat from peripheral heating means 16 along the length of outer ring 5, without interfering with the axial freezing of the material in the direction of arrows B from freezing surfaces 3a, 4a.

During the progressive freezing operation, heat is directed into the molten mass 18 from convective heating element 20 in a direction opposite to that of the centrifugal force along and in a position ahead of the advancing solid-liquid interfaces 17 as indicated by arrows C. This heat from heating element 20 acts in conjunction with the cooling effect at solid-liquid interfaces 17 to induce strong convection currents in the molten mass 18, thereby to induce rapid convective flow of molten material past the advancing solid-liquid interfaces 17 in a direction transversely to the direction of solidification, as shown by arrows D.

With the freezing arrangement of FIG. 1, purified solid material is concentrated at opposite ends of container 1 and impurities are concentrated in the central regions of the container intermediate freezing surfaces 3a, 4a. It has been found advantageous not to solidify all the molten material in container 1 but only a portion thereof, say 80 percent. The residual molten material 18 is drained off from between the two layers 19 of solidified material on freezing surfaces 3a, 4a, thereby to remove the concentrated impurities and leave the layers 19 of purified solid material free for recovery.

It is a particular advantage of the method according to the invention that a high rate of freezing can be used to render a finished product containing a very small amount of impurities. The following numerical example illustrates the advantage that can be obtained with the invention and it will be seen that by carrying out directional freezing under the influence of centrifugal force and with a convective flow of molten material sweeping past the advancing solid-liquid interface, increased purification can be obtained with increased freezing rate, as compared with conventional stationary methods.

EXAMPLE

Different samples of similar crude, coke oven naphthalene ("whizzed naphthalene") were subjected to directional freezing:

a. in a conventional stationary system, and b. according to the invention in rotary apparatus similar to that shown in FIG. 1 at two rotational speeds of 500 r.p.m. and 2,000 r.p.m.

In each case the conditions of cooling were such that about 80 percent of the naphthalene froze out over a period of 2 hours. A flow of molten material at a rate of about 1,500 cm./sec past the solid-liquid interfaces was obtained in the rotary system at 2,000 r.p.m. The directional freezing was repeated four times to give four recrystallization cycles.

The stationary freezing chamber was rectangular in cross-section with freezing in opposite directions across the width of the chamber from a pair of opposed freezing surfaces. Internally the chamber was 18.7 cm. long and 4.1 cm. wide (i.e., the distance between the freezing surfaces.) When charged with 380 grams of molten naphthalene, the depth of molten material was 5.0 cm.

The rotary freezing chamber had an effective diameter of 17.8 cm. measured to the inner periphery of peripheral heating means 16 in FIG. 1. The distance between freezing surfaces 3a, 4a was 3.81 cm. When charged with 820 grams of molten naphthalene, the radial thickness of the annular layer of material between the inner surface 11 and the inner periphery of peripheral heating means 16 during rotation was 5.0 cm. The centrifugal fields at the two speeds of rotation were:

| Speed of Rotation R.P.M. | Centrifugal Field At | |
|---|---|---|
| | Inner Peripheral Surface 11 of Material | Outer peripheral Surface of Material |
| 500 | 10 times gravity | 25 times gravity |
| 2,000 | 160 times gravity | 400 times gravity |

In addition, substantially similar crude naphthalene was subjected to 4 recrystallization cycles of very slow, carefully controlled directional freezing in a stationary system to give a yield of about 80 percent solid material. To minimize entrapment of molten material in freezing solid, each crystallization cycle was carried out in two or more stages by centrifuging off the frozen solid obtained after about 40 percent of the original molten charge had frozen, thereafter continuing the freezing with the resultant filtrate until about another 40 percent thereof had frozen out and again centrifuging off the frozen solid which is obtained. The solid fractions which are centrifuged off were combined to give the quantity of material that would have frozen out in about an 80 percent yield.

The crystallizing point and the naphthalene content of the resultant products were determined after each recrystallization cycle in each case. The average results obtained from several tests conducted for each case, are given below, the crystallizing point being given in °C and the naphthalene content being given as % w/w.

| Recrystallization Cycle | Freezing time hours | Starting Material | | Product | | |
|---|---|---|---|---|---|---|
| | | C.P. °C | %w/w | C.P. °C | %w/w | % yield |
| Stationary System. | | | | | | |
| 1st | 2 | 76.34 | 92.33 | 76.64 | 92.91 | 79 |
| 2nd | 2 | 76.64 | 92.91 | 76.83 | 93.26 | 75 |
| 3rd | 2 | 76.83 | 93.26 | 77.20 | 94.00 | 80 |
| 4th | 2 | 77.20 | 94.00 | 77.57 | 94.74 | 83 |
| Rotating System at 500 r.p.m. | | | | | | |
| 1st | 2 | 76.17 | 91.99 | 78.04 | 95.68 | 78 |
| 2nd | 2 | 78.04 | 95.68 | 79.03 | 97.61 | 83 |
| 3rd | 2 | 79.03 | 97.61 | 79.75 | 99.05 | 86 |
| 4th | 2 | 79.75 | 99.05 | 80.01 | 99.52 | 84 |
| Rotating System at 2,000 r.p.m. | | | | | | |
| 1st | 2 | 76.30 | 92.25 | 79.02 | 97.59 | 76 |
| 2nd | 2 | 79.02 | 97.59 | 79.86 | 99.27 | 76 |
| 3rd | 2 | 79.86 | 99.27 | 80.06 | 99.62 | 80 |
| 4th | 2 | 80.06 | 99.62 | 80.13 | 99.76 | 83 |
| Slow Freezing | | | | | | |
| 1st | 378 | 76.25 | 92.15 | 79.64 | 98.83 | 80 |
| 2nd | 116 | 79.64 | 98.83 | 80.01 | 99.52 | 78 |
| 3rd | 134 | 80.01 | 99.52 | 80.12 | 99.74 | 86 |
| 4th | 137 | 80.12 | 99.74 | 80.17 | 99.84 | 79 |

The approximate linear freezing rate in the stationary and rotating systems, but not in the slow freezing system, was 0.7 cm. per hour.

Figure 3:
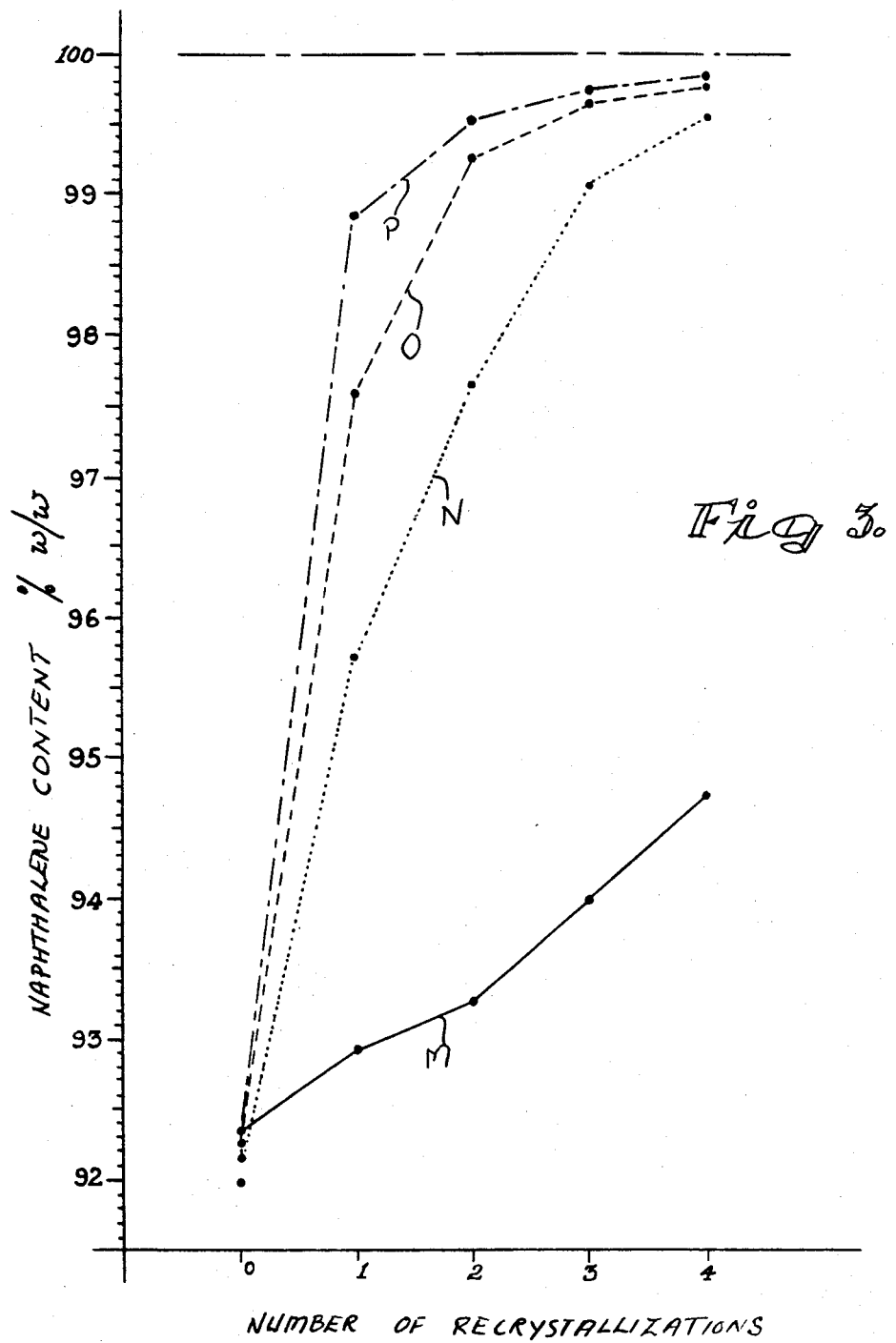

The crystallizing points and the naphthalene contents of the resultant products are represented graphically in FIGS. 2 and 3 respectively, in each of which the curve M represents the results for the stationary system, curve N the results for the rotating system at 500 r.p.m., curve O the results for the rotating system at 2,000 r.p.m. and curve P the results for vary slow freezing. It is clear that the results obtained in a rotating system according to the invention (curves N and O), are far superior to those obtained with the stationary system (curves M) in the same time. The results obtained with very slow freezing (curves P) are somewhat better than those obtained with the rotating system according to the invention at 2,000 r.p.m. (curves O) but here it should be borne in mind that with the slow freezing, extended periods of time of more than 100 hours and even as long as 378 hours are required for each recrystallization cycle, as compared with the recrystallization cycle of only 2 hours with the rotating system. In FIG. 2 the line RS represents the crystallizing point of 100 percent naphthalene at 80.29°C.

To illustrate the advantage obtained by inducing a convective flow of molten material past the advancing solid-liquid interfaces 17 in a direction transversely to the direction of solidification, tests were conducted with samples of crude coke oven naphthalene having a crystallizing point of 76.30°C (a naphthalene content of 92.25% w/w) under identical conditions and with the same apparatus as the tests for the rotating system at 2,000 r.p.m. discussed above, with the exception that the convective heating element 20 and the peripheral heating means 16 were not switched on. As a result, molten material not only froze axially from end plates 3 and 4 of the apparatus of FIG. 1, but also radially inwardly from outer ring 5. Furthermore, no convection currents and thus no flow of molten material past the advancing solid-liquid interfaces 17 were induced.

Several tests were carried out, each at a rotational speed of 2,000 r.p.m. and over a period of two hours at a cooling rate such that the thickness of the layers 19 of solid material on freezing surfaces 3a, 4a was the same as that obtained in the tests for the rotating system at 2,000 r.p.m. using heaters 16 and 20 as discussed above, namely 1.4 cm. At the end of each test, the residual unfrozen material 18 from between the layers 19 of solid material on freezing surfaces 3a, 4a, was allowed to settle in the space 8 and congeal in contact with the lower layer of solid material on the bottom end plate 4, thus leaving the radially inwardly disposed zone of the layer of solid material on the upper end plate 4 which is located remote from the solid material that froze radially inwardly from outer ring 5, uncontaminated by the congealed mother liquor.

This uncontaminated material was removed and tested. Several tests indicated that the crystallizing point of such uncontaminated material was generally in the region of 78.0°C (a naphthalene content of 95.6% w/w) but was often as low as 77.6°C (a naphthalene content of 94.8 percent), in spite of the fact that the purest portion of the upper layer of solidified material was selected for the analysis. This compares unfavorably with the crystallizing point of more than 79.0°C (naphthalene content of 97.55 % w/w) which is produced consistently in an 80 percent yield over a period of 2 hours at 2,000 r.p.m. from the same starting material when the convective heater element 20 is used to produce strong convection currents.

It can also be mentioned that the material which crystallized radially inwardly from outer ring 5 was always found to be more impure than the starting material.

It will be appreciated that many variations in detail are possible without departing from the scope of the appended claims. Certain variations are illustrated in the alternative arrangement of FIG. 4. Similar parts are indicated by similar reference numerals in FIGS. 1 and 4.

Figure 4:
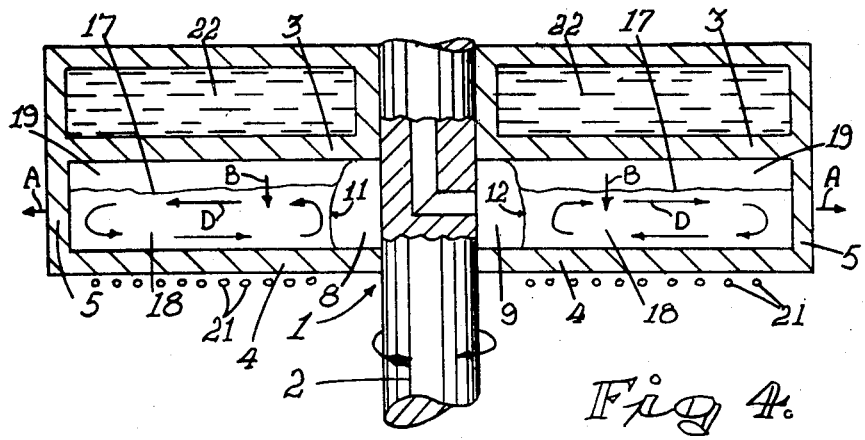
FIG. 4 is a diagrammatic vertical sectional view of another form of rotary directional freezing apparatus, suitable for carrying out the invention.

Instead of a convective heater of localized extent in the direction of advance of the solid-liquid interfaces 17, such as 20 in FIG. 1, a spirally wound or any other suitable heating element 21 may be provided in close proximity to the lower end plate 4 of the apparatus of FIG. 4, thereby to heat end plate 4 and create convection currents as shown by arrows D.

In FIGS. 1 and 4, the direction of convective flow indicated by arrows C and D are shown in radial planes. In practice, Coriolis forces cause the convective flow to curve spirally in a plane parallel to a solid-liquid interfaces 17.

Instead of relying on atmospheric cooling of the end plates 3 and 4 of the container as in FIG. 1, a cooling jacket 22 may be provided in association with upper end plate 3 as shown in FIG. 4.

It will be seen that with the arrangement of FIG. 4, solidification proceeds axially in a downward direction only from upper end plate 3 as shown by arrows B. The arrangement could be reversed with convective heater 21 associated with upper end plate 3 and cooling jacket 22 associated with bottom end plate 4 so that solidification proceeds upwardly from lower end plate 4 in a direction opposite to that of arrows B.

When directional freezing takes place from one side only of the container, the moving solid-liquid interface causes impurities to be concentrated either at the top or the bottom of the container, purified material being concentrated at the opposite end of the container.

The axes of rotation of the apparatus of FIGS. 1 and 4 are shown to be disposed vertically, but they could be disposed horizontally.

The embodiments illustrated in FIGS. 1 and 4 are adapted for batch operation. Suitable apparatus for continuous operation may also be provided.

I claim:

1. A method of purifying crystallizable material comprising the steps of progressively solidifying a molten mass of the material from opposite points in the mass to produce in the mass solid-liquid interfaces that advance toward a common plane; rotating the material during solidification about an axis perpendicular to said plane to subject the material to centrifugal force which is at least equal to the force of gravity and which acts in a directional transverse to the directions of solidification; and introducing heat into the molten material to induce convective flow of molten material past said advancing solid-liquid interfaces in a direction transverse to the directions of solidification.

2. A method as claimed in claim 1, wherein the material is rotated about an axis which does not pass through the material under treatment.

3. A method as claimed in claim 1, wherein the centrifugal force has a magnitude at least ten times the force of gravity.

4. A method as claimed in claim 1, wherein the convective flow of molten material past the advancing solid-liquid interfaces is in the same direction as that in which the centrifugal force acts.

5. A method as claimed in claim 1, wherein the convective flow of molten material is induced by directing heat into the molten mass in a direction along and in a position ahead of the advancing solid-liquid interfaces from a heat source which is of localized extend in the directions of advance of the solid-liquid interfaces.

6. Directional freezing apparatus including a material container rotatable about an axis and having a retaining wall spaced from the axis and rotatable with the container about the axis; drive means operative to rotate the container at a speed producing centrifugal force in excess of the force of gravity to urge material in the container against the retaining wall; a pair of spaced-apart opposed freezing surfaces in the container in the proximity of the retaining wall, the freezing surfaces being operative to solidify molten material located in the container against the retaining wall and to produce a pair of solid-liquid interfaces advancing progressively from opposite points toward a common radial plane perpendicular to said axis; and convective heating means operatively related to the container to direct heat into the container and induce a convective flow of molten material past the advancing solid-liquid interfaces in a direction transverse to the directions of solidification.

7. Directional freezing apparatus as claimed in claim 6, including means operative to cool the freezing surfaces.

8. Directional freezing apparatus as claimed in claim 6 wherein the convective heating means comprises a heating element having limited dimensions in an axial direction and located about the rotational axis in close proximity to the retaining wall in a position spaced axially from the freezing surfaces.

9. A method of purifying crystallizable material comprising the steps of establishing a confined molten mass of the material, rotating said mass about an axis at a speed to subject the material to centrifugal force which is at least equal to the force of gravity, abstracting heat from the said mass in opposite directions and at a rate to produce progressive solidification of said mass in opposite directions transverse to the direction of said centrifugal force thereby to produce in said mass solid-liquid interfaces which advance in said transverse directions from opposite points toward a common radial plane perpendicular to said axis, and introducing heat into the molten mass to induce convective flow of molten material past said advancing interfaces in a direction transverse to said directions of advance of said interfaces.

* * * * *